United States Patent Office 3,122,512
Patented Feb. 25, 1964

3,122,512
METHOD OF RETARDING ALUMINA LOSS IN THE REMOVAL OF NICKEL AND VANADIUM FROM CATALYSTS
Robert L. Foster, Homewood, and William B. Watson, Park Forest, Ill., assignors, by mesne assignments, to Sinclair Research, Inc., New York, N.Y., a corporation of Delaware
No Drawing. Filed Sept. 7, 1960, Ser. No. 54,368
9 Claims. (Cl. 252—415)

This invention concerns preventing the loss of alumina from a silica-alumina synthetic gel hydrocarbon conversion catalyst in a certain acid wash procedure. It has been found that a catalyst which has been contaminated with poisoning metals by use in the high temperature catalytic conversion of feedstocks containing such metals may be demetallized by a chlorination treatment followed by an acidic aqueous wash. This invention comprises adding a base to the slurry of catalyst in the aqueous wash medium to provide a pH of about 2.5–6.0, preferably about 3.5–5.0, in order to reduce alumina loss.

Copending patent application S.N. 849,199, filed October 28, 1959, describes procedures by which vanadium and other poisoning metals such as iron and nickel included in a solid oxide hydrocarbon conversion catalyst are removed by subjecting the catalyst, outside the hydrocarbon conversion system, to elevated temperature conditions which put the metal contaminants into chloride form. The chlorination treatment serves to remove Fe and V as the volatile chloride and put Ni contaminants in a soluble form. However, it has been found that while an acid environment is advantageous for effective Ni removal and that this acidic environment is frequently provided by the presence of the acid-acting chlorides formed as the result of the chlorination process, the pH of the solution, if too low, causes a fraction of the alumina content of the catalyst to be undesirably lost. It has also been found that at high pH values hydrolysis of soluble or otherwise dispersible nickel salts with subsequent precipitation of nickel compounds on the catalyst is favored with a resulting decrease in the net amount of metal contaminant removal. Accordingly, it is an object of this invention to surmount these disadvantages by adjusting and maintaining the pH of the wash solution at a level where the nickel contaminant removal and the retardation of alumina loss from the catalyst are optimized.

Catalytically promoted methods for the chemical conversion of hydrocarbons include cracking, hydrocracking, reforming, hydroforming, etc. Such reactions are generally performed at elevated temperatures, for example, about 300–1200° F., more often 600–1000° F. Feedstocks to these processes generally comprise normally liquid and solid hydrocarbons which at the temperature of the conversion reaction are fluids, i.e. in the liquid or vapor state, and the products of conversion frequently are lower boiling materials. In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 850–100° F. preferably about 875–950° F., at pressures between about 0 and 25 p.s.i.g., and with a weight hourly space velocity from about 0.1 to 10.0 to obtain the main production of gasoline. In cracking, the feedstock is usually a mineral oil or petroleum hydrocarbon fraction such as straight run or recycle gas oils or other normally liquid hydrocarbons boiling above the gasoline range.

In this invention the hydrocarbon petroleum oils utilized as feedstock for a conversion process may be of any desired type normally utilized in catalytic conversion operations. This feedstock contains poisoning metals, sometimes as much as 3%, and the catalyst may be used as a fixed, moving or fluidized bed or may be in a more dispersed state. For typical operations, the catalytic cracking of the hydrocarbon feed would normally result in a conversion of about 50 to 60% of the feedstock into butanes, butylenes, and products boiling in the gasoline range. The catalytic conversion system can also include a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure.

Silica-based cracking catalysts, including naturally occurring activated clays and synthetically prepared composites, have long been recognized as useful in catalytically promoting hydrocarbon conversion reactions. Such siliceous catalysts contain silica and frequently one or more promoting metal oxides. In clays, the promoting metal oxide is predominantly alumina. Active synthetic cracking catalysts are generally gels or gelatinous precipitates and include silica-alumina, silica-zirconia and silica-magnesia, as well as ternary combinations such as silica-alumina-zirconia and silica-alumina-magnesia. Popular synthetic gel cracking catalysts generally contain 10–30% alumina. Two such catalysts are "Aerocat" which contains about 13% $Al_2O_3$ and "High Alumina Nalcat" which contains about 25% $Al_2O_3$, with substantially the balance being silica. The catalyst may be only partially of synthetic material; for example, it may be made by the precipitation of silica-alumina on clay, such as kaolinite or halloysite.

This invention is primarily concerned with the maintenance of substantially the original alumina content in the synthetic gel silica-alumina catalysts. Synthetic cracking catalysts may be prepared by various well known methods such as by cogelation or coprecipitation of the silica and metal oxide, or by milling together the separately precipitated or gelled components. Alternatively, the promoting metal oxide may be combined with a previously formed siliceous gel utilizing impregnation techniques. The present invention, however, is not limited to a catalyst prepared by any particular method but it is of general application to synthetic gel hydrocarbon conversion catalysts. These synthetic gel-type catalysts may be activated or calcined before use.

One of the most important phases of study in the improvement of catalyst performance in hydrocarbon conversion is in the area of metals poisoning. Although referred to as "metals," these catalyst contaminants may be in the form of free metals or relatively nonvolatile metal compounds. It is to be understood that the term "metal" used herein refers to either form. Metals may naturally occur in various petroleum stocks or occur by virtue of the tendency of the petroleum stock to pick up tramp iron from transportation and processing equipment. Contaminating metals when present in a stock deposit in a relatively non-volatile form on the catalyst during the conversion processes so that regeneration of the catalyst to remove coke does not remove these contaminants. The presence of such contaminants as vanadium, nickel, iron and copper are highly detrimental to the efficiency of catalysts and when so contaminated, cause decreased activity and excessive coke formation during cracking reactions.

The poisoning effects of metal contaminants on synthetic gel hydrocarbon conversion catalysts have heretofore been recognized in the art. Various techniques have been suggested to remove the metal contaminants. For example, the processes of copending applications, Serial Nos. 763,834, filed September 29, 1958, and now abandoned; 849,199, filed October 28, 1959; 842,618, filed September 28, 1959; and 19,313, filed April 1, 1960, are illustrative of such processes and are incorporated herein by reference.

A poisoned catalyst may be reduced in nickel content by an aqueous wash when nickel contaminants are put into the sulfate or other water-soluble form by oxidizing a sulfided nickel-contaminated catalyst. Such an oxidation may be performed by an oxidizing vapor, as disclosed in copending application Serial No. 763,834, filed September 29, 1958; or by an aqueous oxidizing agent, as set forth in copending application Serial No. 842,618, filed September 28, 1959. It has been found that iron and vanadium may be removed from a catalyst by converting the metals into volatile compounds; a chlorination treatment can convert iron and vanadium to volatile chlorides as reported in copending application Serial No. 849,199, filed October 28, 1959. Also as pointed out in copending application Serial No. 19,313, filed April 1, 1960, a preliminary treatment of the catalyst with molecular oxygen-containing gas is of value in improving the vanadium removed by subsequent procedures.

As stated previously this invention is advantageously used in conjunction with demetallization effected by chlorination of the metal contaminated catalyst. The chlorination process is conducted at a moderate temperature up to about 1000° F. wherein the catalyst composition and structure is not harmed by the treatment and a substantial amount of the poisoning metal content is converted to chlorides. Chlorination may be combined with other procedures for improved demetallization of catalysts which have become poisoned by use in the high temperature conversion of metals-contaminated feedstocks. For example, the chlorination may be preceded by sulfiding the poisoning metals to improve the removal of nickel poisons in subsequent steps; the treatment with the chlorination agent may be followed by treatment with an inert vapor to enhance volatilization of the iron and vanadium chlorides formed. A significant advantage of the process of this invention lies in the fact that an overall metals removal operation which employs it, even if repeated, can avoid deleterious effects on the activity, selectivity, porosity, and other desirable characteristics of the catalyst. Ordinarily the catalysts are treated before the poisoning metals have reached an undesirably high level, for instance, about 2%, generally no more than about 0.5% maximum, content of one or both nickel and vanadium calculated as their common oxides. Before treatment is usually warranted the catalyst will have at least about 25–50 p.p.m. of nickel oxide and/or about 250–500 p.p.m. vanadium pentoxide. The chlorination takes place at a temperature up to about 1000° F., usually at least above about 300° F. and preferably about 550 to 650° F. The chlorination reagent is essentially anhydrous that is, if liquified it would contain no separate aqueous phase, and preferably the reagent is a vapor which contains a chlorination promoting compound of chlorine with carbon or sulfur. Such chlorinating reagents include molecular chlorine but preferably are the chlorine-substituted light hydrocarbons, such as carbon tetrachloride, which may be used as such or formed in situ by use of, for example, a vaporous mixture of chlorine gas with low molecular weight hydrocarbons such as methane. Also it has been found that a mixture of the carbon or sulfur chlorinating reagent with a gas, such as molecular chlorine or HCl which can supply additional chlorine, may be effective in reducing the amount of chlorinating reagent required for effective conversion of iron and vanadium to their volatile chlorides. Molecular chlorine is considerably less expensive than carbon tetrachloride so that a gaseous mixture of the two is the preferred chlorinating reagent. The presence of molecular chlorine also seems to have the advantageous effect of keeping the iron and vanadium in their higher, more volatile valence states; that is, the iron is kept in the ferric state and the vanadium is maintained as vanadium oxytrichloride or vanadium tetrachloride. Sulfur monochloride, with or without elemental chlorine, appears to be advantageous for use as a chlorinating reagent, sulfur monochloride being considerably less expensive than $CCl_4$. Sulfur dichloride also shows advantageous properties, since it may be supplied as a liquid to the chlorination procedure and upon vaporization will give a mixture of sulfur monochloride and chlorine. Thionyl chloride has also been used with results comparable to those using $CCl_4$. The chlorination agent can contact the catalyst until iron chloride is no longer evolved; this may take about 5 to 120 minutes, more usually about 20–60 minutes but shorter or longer periods may be possible or needed, for instance depending on the linear velocity of the chlorinating vapors.

The stoichiometric amount of chlorine required to convert iron, nickel and vanadium to their most highly chlorinated compounds is the minimum amount of chlorine ordinarily used and may be free chlorine, combined chlorine or a mixture of chlorine with the chlorine compound promoters described above. However, since the stoichiometric amount of chlorine frequently is in a neighborhood of only 0.001 g./g. of catalyst, a much larger amount of chlorine, say about 1–40 percent active chlorinating agent based on the weight of the catalyst is used. The amount of chlorinating agent required is generally increased if any significant amount of water is present on the catalyst so that substantially anhydrous conditions preferably are maintained as regards the catalyst as well as the chlorinating agent. The promoter is generally used in the amount of about 1–5 or 10 percent or more, preferably about 2–3 percent, based on the weight of the catalyst for good metals removal; however, even if less than this amount is used, a considerable improvement in metals conversion is obtained over that which is possible at the same temperature using chlorine alone. The amount of promoter may vary depending upon the manipulative aspects of the chlorination step, for example, a batch treatment may sometimes require less promoter than in a continuous treatment for the same degree of effectiveness and results. The chlorine and promoter may be supplied individually or as a mixture to the poisoned catalyst. Such a mixture may contain about 0.1 to 50 parts chlorine per part of promoter. A chlorinating gas comprising about 1–30 weight percent chlorine, based on the catalyst, together with one percent or more $S_2Cl_2$ gives good results. Preferably, such a gas provides 1–10 percent $Cl_2$ and about 1.5 percent $S_2Cl_2$, based on the catalyst. A "saturated" mixture of $Cl_2$ and $CCl_4$ can be made by bubbling chlorine gas at room temperature through a vessel containing $CCl_4$; such a mixture generally contains about 1 part $CCl_4$:5–10 parts $Cl_2$.

Conveniently, a pressure of about 0–100 or more p.s.i.g., preferably about 0–15 p.s.i.g. may be maintained in chlorination. Generally, the major proportion of the volatile chlorides produced is removed during contact with the chlorinating vapor and where the volatile chlorides are insufficiently removed, a purge with an inert gas such as nitrogen at an elevated temperature may be applied to the chlorinated catalyst. A fluidized solids technique is recommended for these processes as a way to shorten the time requirements. After the available catalytically active poisoning metal has been removed, further reaction time has relatively little effect on the catalytic activity of the depoisoned catalyst.

In practice of this invention chlorinated contaminants, especially nickel, are removed from the catalyst by slurrying and washing it with an acidic aqueous solution. This aqueous wash medium will be sufficiently acidic to effect nickel removed due to acid-acting chlorides or some entrained chlorine on the catalyst present as the result of the chlorination process. The aqueous wash medium contains water-soluble basic compounds, which are added to provide and maintain a slurry pH of about 2.5 to 6.0 and preferably of about 3.5 to 5.0. In the preferred embodiment of this invention, the pH control may be performed by the addition of ammonia or ammonium hydroxide and such non-metallic compounds are most desirable. Other basic compounds such as sodium hydroxide; alkali metal salts of weak acids, e.g. sodium acetate and sodium carbonate; potassium hydroxide; barium hydroxide; and calcium hydroxide may be used to control the pH, but ammonium ions are preferred to prevent possible contamination of the catalyst with sodium, potassium, calcium, etc. metals. The aqueous wash solution can be prepared by the addition of a dry reagent or a concentrated solution to the slurry. Ammonia gas may be dissolved directly in water. The solution should be substantially free, before contact with the catalyst, of any contaminant materials which remain deposited on the catalyst in deleterious amounts. The amount of base in the solution is sufficient to give the desired pH.

The temperature of the wash solution may be at room temperature or below and can be maintained up to about 210° F. The wash solution temperature is not critical as concerns the amount of alumina loss from the catalyst although an increase in the washing temperature shows a possible increase in alumina loss over that found at lower washing temperatures. The contact time of the catalyst with the liquid wash solution should be of sufficient duration to effect the metal contaminant removal and short contact times, in the order of 3–5 minutes, have proved effective. However, contact periods as low as about 1 minute have been satisfactory as well as washing for a period of about 2–5 hours or longer. The greatest alumina loss is usually prone to occur during the early stages of the wash with a subsequent decline in the rate of alumina loss thereafter.

The pH of the wash slurry, without addition of a base for control of pH, has been found to be inversely proportional to both the concentration of the slurry and to the amount of chlorine retained on the catalyst as a result of the chlorination process. Increasing the slurry solids concentration and increasing the amount of entrained chlorine on the catalyst beyond that necessary to provide the acidity required to effectively remove the soluble metal contaminants results in a greater natural acidity requiring increased amounts of a basic compound to raise pH and prevent solution of significant quantities of the alumina.

To minimize the alumina losses the pH of the aqueous wash slurry should be so maintained that the result will be a maximum metals contaminant removal and a minimum alumina loss. This is effected in the practice of this invention by maintaining the pH of the aqueous wash slurry at about 2.5 to 6.0 by the addition of ammonium hydroxide or other basic compounds. The wash solution being acidic within this specified range not only provides for a minimum alumina loss but also provides maximum metal-contaminant removal.

The following examples are illustrative of the process of this invention, but should not be considered limiting.

EXAMPLE I

A slip stream of synthetic gel catalytic cracking catalyst composed of about 26.1 weight percent alumina, substantially the rest $SiO_2$, was withdrawn from the standpipe of the regenerator of a fluid catalytic cracking unit. This catalyst had been contaminated to 327 p.p.m. of nickel oxide, 4240 p.p.m. of vanadium pentoxide and 27000 p.p.m. of iron by cracking a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. The gas oil blend had a gravity (API) of 24°, a carbon residue of about 0.3 weight percent and a boiling range of about 500 to 1000° F. The catalyst was processed in a batch demetallization unit wherein it was treated with hydrogen sulfide at 1150° F. at atmospheric pressure for approximately 1½ hours. Subsequently it was treated with $Cl_2$ saturated with $CCl_4$ at 600° F. at atmospheric pressure for approximately 1 hour. The catalyst, thus chlorinated, was divided into five portions and each portion was slurry-washed in various acidic aqueous media with pH adjusted by the addition of ammonium hydroxide. The washed catalysts were then filtered, dried and analyzed, with the results shown in Table I.

Table I

| | A | B | C | D | E |
|---|---|---|---|---|---|
| Catalyst in Slurry, wt. percent | 4.05 | 4.5 | 4.3 | 4.5 | 5 |
| pH of Slurry | 2.1 | 2.6 | 4.1 | 4.5 | 7.5 |
| Alumina in Filtrate, percent | 0.023 | 0.022 | 0.012 | 0.0035 | 0 |
| Alumina Loss from Catalyst, percent [1] | 0.54 | 0.46 | 0.12 | 0.07 | 0 |
| Metal Content: | | | | | |
| NiO, p.p.m. | 106 | 119 | 108 | 138 | 222 |
| $V_2O_5$, p.p.m. | 3,800 | 3,855 | 3,827 | 3,872 | 2,938 |
| Fe, p.p.m. | 2,470 | 2,500 | 2,560 | 2,540 | 2,550 |

[1] Calculated from slurry concentration and percent alumina in the filtrate.

These data clearly show that the alumina loss decreases with increasing pH of the slurry medium. All tests showed substantial metal contaminant removal from the catalyst. It was also observed that increasing the pH from 4.5 to 7.5 resulted in nickel chloride hydrolysis which precipitated the metal contaminant onto the catalyst yielding a decrease in the removal of nickel from the surface of the treated catalyst.

EXAMPLE II

A slip stream of synthetic catalytic cracking catalyst composed of 26.3 weight percent alumina, substantially the rest $SiO_2$, was withdrawn from the regenerator of a fluid catalytic cracking unit where it was used in cracking feedstock A. This catalyst was contaminated with 218 p.p.m. of nickel oxide. The catalyst was divided into two portions. Each portion was heated in air at 1300° F. for 1 hour, sulfided with $H_2S$ at 1175° F. for 1 hour and chlorinated with a mixture of chlorine and $CCl_4$ at 600° F. for 1 hour. One portion was then slurried with 2.3 gallons of water per pound of catalyst. The resulting pH was 2.2. The second portion was also slurried with 2.3 gallons of water per pound of catalyst but the pH was maintained at 4.5 by the addition of sodium acetate. Both portions of the slurried catalyst were agitated for 5 minutes and subsequently filtered to produce a filter cake which was treated with a wash of 0.6 gallon of water per pound of catalyst. The filter cakes were then dried in air at 600° F. for three hours and calcined in air at 1000° F. for 15 minutes.

The above demetallization steps were then repeated three times on each portion of the catalyst with the results found in the following table.

Table II

| | Untreated Catalyst | Catalyst Treated Four Times | |
|---|---|---|---|
| pH of Slurry Wash | | 2.2 | 4.5 |
| Tests on Catalyst: | | | |
| Alumina, Wt. Percent | 26.3 | 24.4 | 26.0 |
| NiO, p.p.m. | 218 | 19 | 23 |

The results shown in the above table indicate that while both treated catalysts are significantly freed from the metal contaminant NiO, the catalyst which was treated under conditions wherein the pH was controlled at 4.5 by the addition of a basic compound retained a significantly greater amount of its original alumina content than did the catalyst that was subjected to the demetalization treatments without benefit of the instant invention.

In practice the process could be applied in a refinery by removing a portion of the catalyst from the regenerator or regenerator standpipe of the cracking system after a standard regeneration treatment to remove a good part of the carbon, chlorinating this portion of the catalyst, then slurrying the catalyst in an acidic aqueous solution of controlled pH. The treated catalyst can be returned to the unit, for example, to the regenerator, reducing greatly the new catalyst requirement.

It is claimed:

1. A method for retarding the loss of alumina from a synthetic gel silica-alumina hydrocarbon conversion catalyst contaminated with metals from use in the conversion of a hydrocarbon feedstock containing poisoning metals selected from the group consisting of nickel and vanadium the steps which comprise removing the catalyst from the hydrocarbon conversion system, chlorinating the poisoning metal in the catalyst by contact with an essentially anhydrous chlorinating agent at a temperature of up to about 1000° F., and removing chlorinated poisoning metal by contact of the catalyst with an aqueous wash solution containing a water-soluble basic compound to control the pH of the resulting slurry at about 2.5–6.0.

2. The method of claim 1 wherein the base is an alkali metal salt of a weak acid.

3. The method of claim 2 wherein the alkali metal salt of a weak acid is sodium acetate.

4. The method of claim 1 wherein the base is ammonium hydroxide.

5. The method of claim 1 wherein the aqueous solution is maintained at a pH of about 3.5–5.0.

6. The method of claim 1 wherein the catalyst is chlorinated by contact with an essentially anhydrous chlorinating agent in amounts of about 1–50 weight percent based on the catalyst.

7. The method of claim 6 wherein the chlorination is at a temperature of about 550–650° F.

8. The method of claim 6 wherein the chlorinating agent contains carbon tetrachloride.

9. A method for retarding the loss of alumina from a synthetic gel silica-alumina hydrocarbon conversion catalyst contaminated with metals from use in the conversion of a hydrocarbon feedstock containing poisoning metals selected from the group consisting of nickel and vanadium, the steps which comprise removing the catalyst from the hydrocarbon conversion system, chlorinating the poisoning metal in the catalyst by contact with an essentially anhydrous chlorinating agent in amounts of about 1–50 weight percent based on the catalyst at a temperature up to about 1000° F. for about 5 to 120 minutes and contacting the catalyst with an aqueous wash solution containing a water-soluble basic compound at a temperature of ambient temperature to about 210° F. for about 1 to 300 minutes to control the pH of the resulting slurry at about 2.5 to 6.0.

References Cited in the file of this patent

UNITED STATES PATENTS

| | | |
|---|---|---|
| 2,481,253 | Snyder | Sept. 6, 1949 |
| 2,668,798 | Plank | Feb. 9, 1954 |